United States Patent Office 2,777,840
Patented Jan. 15, 1957

2,777,840

ASYMMETRICAL UREA DERIVATIVES OF MONOAZO-DYESTUFFS

Hans Wilhelm Liechti, Riehen, and Raymond Gunst, Binningen, Switzerland, assignors to Ciba Limited, Basel, Switzerland, a Swiss firm No Drawing. Application April 29, 1952,
Serial No. 285,058

Claims priority, application Switzerland May 25, 1951

5 Claims. (Cl. 260—175)

The present invention provides new asymmetrical urea derivatives of monoazo-dyestuffs, which contain a single sulfonic acid group as, for example, in the case of the urea derivative of the formula (1)

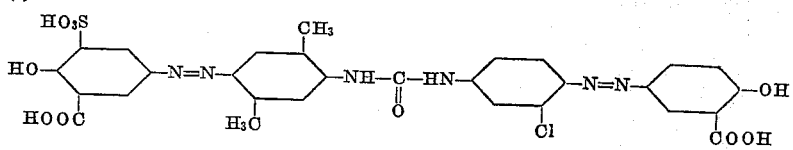

and which correspond to the general formula (2)

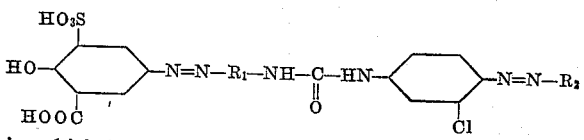

in which $R_1$ represents a benzene radical in which the groups —N=N— and —NH— are in para-position relatively to one another, and $R_2$ represents the radical of a 1-hydroxy-benzene-2-carboxylic acid bound in the 4-position to the azo linkage.

The urea derivatives of the Formula 2 can be made, by treating with phosgene two monoazo-dyestuffs of the formulae (3)

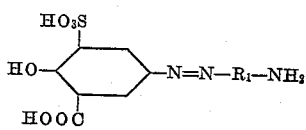

and (4)

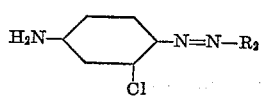

in which $R_1$ and $R_2$ have the meanings given above, and so selecting the starting materials that the resulting asymmetrical urea derivative contains a single sulfonic acid group.

The monoazo-dyestuffs of the Formula 3 can be made by coupling diazotised 4-amino-1-hydroxybenzene-2-carboxylic acid-6-sulfonic acid with an amine of the benzene series capable of coupling in para-position with respect to the amino group (H—$R_1$—$NH_2$) such, for example, as aminobenzene, 1-amino-2- or -3-methyl-benzene, 1-amino-2:5-dimethylbenezene, 1-amino-3:5-dimethylbenzene, 1-amino-2- or -3-methoxy-benzene, 1-amino-2:5-dimethoxy- or -diethoxy-benzene, 1-amino-2-ethoxy-5-methoxy-benzene, 1-amino-2-propyloxy-5-methoxy-benzene and 1-amino-2-methoxy-5-methylbenzene.

The coupling of diazotized 4-amino-1-hydroxy-benzene-2-carboxylic acid-6-sulfonic acid with the amine of the formula H—$R_1$—$NH_2$ is carried out in a manner in itself known in a weakly acid medium, for example an acetic acid medium. Amines which couple with difficulty such, for example, as aminobenzene, are advantageously coupled in the form of their so-called ω-methane sulfonic acids and the ω-methane sulfonic acid group is subsequently split off.

The monoazo-dyestuffs of the Formula 4 also used as starting materials in the present process can be made by coupling diazotized 1-amino-2-chloro-4-nitro-benzene or diazotized 1-amino-2-chloro-4-acetylamino-benzene with 1-hydroxybenzene-2-carboxylic acid or, if desired, with a substitution product thereof capable of coupling, and converting into an —$NH_2$— group the nitro- or acylamino-group present in para-position to the azo linkages resulting monoazo-dyestuff.

In connection with the preparation of the monoazo-dyestuffs of the Formula 4 it may be mentioned that couplings with hydroxy-carboxylic acids are advantageously carried out in an alkaline medium, for example, a medium rendered alkaline with the hydroxide of an alkali metal or of an alkaline earth metal or of magnesium. The reduction of the nitro-monoazo-dyestuff to the amino-monoazo-dyestuff must naturally be carried out under conditions such that the azo linkage is not attacked, for example, by means of an alkali metal or ammonium sulfide or hydrosulfide at a moderately raised temperature. The hydrolysis of dyestuffs containing acylamino groups may be carried out, for example, by heating the dyestuffs in a dilute solution of an alkali hydroxide or in a dilute mineral acid.

The linking of the amino-monoazo-dyestuffs of the Formulae 3 and 4 by means of phosgene to form the asymmetrical urea derivative is advantageously conducted in an aqueous medium, and preferably with dyestuffs in the form of their alkali salts and with the addition to the reaction mixture of an acid-binding agent such, for example, as an alkali carbonate, alkali acetate or an alkali ortho-phosphate or alkali pyrophosphate, in order, by virtue of the buffer action of these additions, to maintain the pH value within the range of about 9.5 to 5.5 which is especially favorable for the reaction with phosgene.

The new dyestuffs of the invention, which have the above Formula 2, are suitable more especially for dyeing or printing cellulose materials such as cotton, linen, and artificial silk or staple fibers of regenerated cellulose. The dyeings obtainable on these fibrous materials with the new dyestuffs by the usual methods of direct dyeing, for example, with the addition of sodium sulfate and sodium carbonate, are distinguished by good properties of fastness and a very good capacity for being discharged.

Especially valuable dyeings, which are distinguished by very good fastness to washing and light, are obtained by treating the dyestuffs on the fiber or partially on the fiber and partially in the dyebath with an agent yielding metal. It is of advantage to use, for example, the process of U. S. Patent No. 2,148,659 in which first the dyeing and then the treatment with an agent yielding metal are carried out in one and the same bath. As agents yielding metal there come into consideration advantageously agents yielding copper, and especially those which are stable to alkaline solutions, such as complex copper tartrates.

Very valuable dyeings are obtained by using the process in which dyeings or prints produced with the metal free dyestuffs are after-treated with an aqueous solution containing a basic formaldehyde condensation product with a compound which contains at least once the atomic grouping

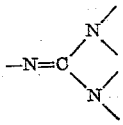

or a compound such as cyanamide easily convertible into a compound containing the aforesaid grouping, and which solution also contains a water-soluble copper compound. Such a process is described, for example in British Patent No. 619,969.

The following examples illustrate the invention, the parts and percentages being by weight:

Example 1

17.25 parts of 1-amino-2-chloro-4-nitrobenzene are diazotized in known manner and coupled with 13.8 parts of 1-hydroxybenzene-2-carboxylic acid in a weakly alkaline solution. A solution of 9.2 parts of sodium hydrosulfide in 50 parts of water is then run in, and the whole is stirred at 60–70° C. until the reduction of the nitro group is finished. 29.1 parts of the separated and dried aminoazo-dyestuff, or a corresponding quantity of the filter paste of the said dyestuff, are dissolved with 35.1 parts of 4-amino-2-methyl-4'-hydroxy-1:1'-azobenzene-3'-sulfonic acid-5'-carboxylic acid in 2000 parts of water with the addition of sufficient sodium carbonate to produce a distinctly alkaline reaction, and the whole is treated with phosgene at 35–40° C. in the presence of sodium acetate as an acid-binding agent, the sodium carbonate being frequently replaced as it is consumed, until amino groups can no longer be detected. The completely precipitated dyestuff of the formula

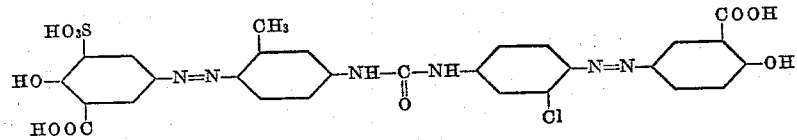

is separated by filtration and dried. It is a yellow brown powder which dissolves in water with an orange coloration and dyes cotton and regenerated cellulose handsome yellow tints having good properties of wet fastness and fastness to light, and a very good capacity for being discharged under neutral and alkaline conditions. By after-coppering in a single or 2-bath process there are produced with this dyestuff somewhat more reddish tints having very good properties of wet fastness and fastness to light.

By using, instead of 4-amino-2-methyl-4'-hydroxy-1:1'-azobenzene-3'-sulfonic acid-5'-carboxylic acid, 4-amino-2-methoxy-4'-hydroxy-1:1'-azobenzene-3'-sulfonic acid-5'-carboxylic acid for producing the asymmetrical urea derivative, there is obtained a dyestuff having the same good properties, and which produces on cotton directly and when coppered somewhat more reddish tints.

Example 2

11.64 parts of the aminoazo-dyestuff (prepared as described in the first paragraph of Example 1 by coupling diazotized 1-amino-2-chloro-4-nitrobenzene with 1-hydroxybenzene-2-carboxylic acid, and then reducing the nitro group) and 7.62 parts of the aminoazo-dyestuff from diazotized 4-amino-1-hydroxybenzene-2-carboxylic acid-6-sulfonic acid and 1-amino-2-methoxy-5-methylbenzene are dissolved in 1000 parts of water in the form of the sodium salt, 20 parts of crystalline sodium pyrophosphate are added as a buffer substance, and phosgene is introduced into the solution at 30° C. while stirring. When the pH value of the reaction mixture has dropped to 5.5 the pH value is restored to 9.5 by the addition of sodium hydroxide solution and further phosgene is introduced until amino groups can no longer be detected.

The new dyestuff of the formula

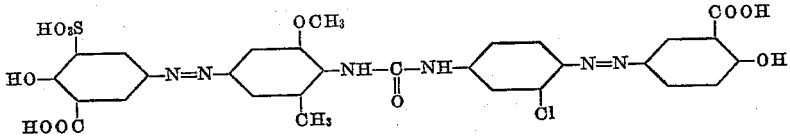

is separated in the form of a green gelatinous precipitate by filtration from the reaction mixture which has now become acid. It is precipitated from a weakly alkaline aqueous solution in the form of its sodium salt or ammonium salt by the addition of sodium chloride, filtered off and dried. It is a pale brown powder, which dissolves in water with a yellow coloration, and dyes cotton and fibers of regenerated cellulose yellow tints having good properties of fastness and a good capacity for being discharged under alkaline and neutral conditions.

By dyeing by the single bath or 2-bath after-coppering process there are obtained yellow tints having very good properties of wet fastness and fastness to light, and which also discharge well.

Example 3

29.1 parts of 4-amino-2-chloro-4'-hydroxy-1:1'-azobenzene-3'-carboxylic acid prepared as described in the first paragraph of Example 1 and 36.5 parts of 4-amino-2:5-dimethyl-4'-hydroxy-1:1'-azobenzene-3'-carboxylic acid-5'-sulfonic acid are treated with phosgene in the manner described in Example 1 until the amino groups have disappeared. The separated and dried dyestuff of the formula

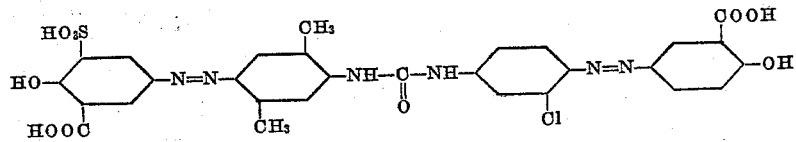

is a brown powder which dissolves in water with an orange coloration, and dyes cotton and regenerated cellulose handsome yellow tints having good properties of wet fastness and fastness to light and a very good capacity for being discharged under neutral and alkaline conditions. By the single bath or 2-bath after-coppering process there are obtained somewhat more reddish tints having very good properties of wet fastness and fastness to light.

By using, instead of 4-amino-2:5-dimethyl-4'-hydroxy-1:1'-azobenzene-3'-carboxylic acid-5'-sulfonic acid, 4-amino-2:5-dimethoxy-4'-hydroxy-1:1'-azobenzene-3'-carboxylic acid-5'-sulfonic acid for producing the asymmetrical urea derivative, there is obtained a dyestuff having the same good properties, and which yields in direct dyeing or when after-coppered somewhat more reddish tints.

Example 4

Into a dyebath which contains, in 4000 parts of water, 2 parts of anhydrous sodium carbonate and 0.6 part of the dyestuff obtainable as described in Example 3 are entered at 50° C., 100 parts of cotton, and the temperature is slowly raised to the boil. 30 parts of crystalline sodium sulfate are then added and dyeing is carried on for ¾ hour at about 95° C. The greenish yellow dyeing so obtained is distinguished by good fastness to washing and light, especially by a very good capacity for being discharged under neutral and alkaline conditions.

A somewhat more reddish yellow dyeing of better fastness to washing and light is obtained by dyeing in the manner described above and subsequently coppering the dyeing in the same bath as follows:

The bath is allowed to cool to 70° C., 1 part of complex sodium copper tartrate is added, the treatment is carried on for ½ hour at about 80° C., and then the cotton is rinsed with cold water.

What is claimed is:

1. A disazo-dyestuff which contains a single sulfonic acid group and corresponds to the formula

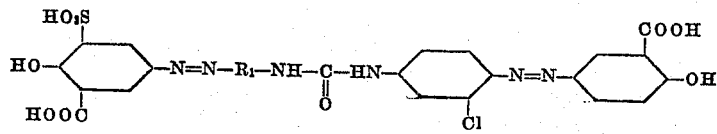

in which $R_1$ represents a benzene radical in which the groups —N=N— and —NH— are in para-position relatively to one another.

2. A disazo-dyestuff which contains a single sulfonic acid group and corresponds to the formula

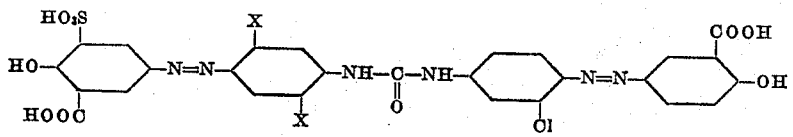

in which at least one of the substituents X represents a member selected from the group consisting of a methyl and a methoxy group and a remaining X represents a hydrogen atom.

3. The disazo-dyestuff which corresponds to the formula

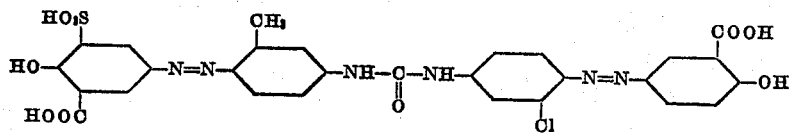

4. The disazo-dyestuff which corresponds to the formula

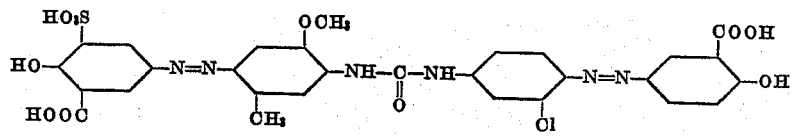

5. The disazo-dyestuff which corresponds to the formula

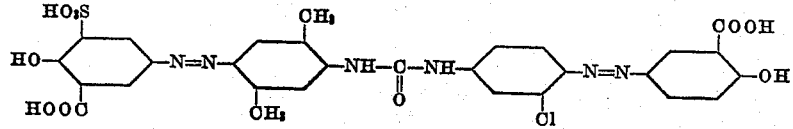

References Cited in the file of this patent

UNITED STATES PATENTS

| | | |
|---|---|---|
| 1,782,682 | Geller | Nov. 25, 1930 |
| 1,843,670 | Gunther et al. | Feb. 2, 1932 |
| 2,375,561 | Kaiser | May 8, 1945 |
| 2,667,477 | Liechti | Jan. 26, 1954 |

FOREIGN PATENTS

| | | |
|---|---|---|
| 263,524 | Switzerland | Aug. 31, 1949 |